United States Patent
Romero Perez et al.

(10) Patent No.: US 11,228,228 B2
(45) Date of Patent: Jan. 18, 2022

(54) ELECTRICAL MACHINE AND MAINTENANCE METHODS THEREOF

(71) Applicant: General Electric Renovables España, S.L., Barcelona (ES)

(72) Inventors: Sergio Romero Perez, Barcelona (ES); Julio César Urresty, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 370 days.

(21) Appl. No.: 16/508,083

(22) Filed: Jul. 10, 2019

(65) Prior Publication Data
US 2020/0021178 A1  Jan. 16, 2020

(30) Foreign Application Priority Data

Jul. 11, 2018 (EP) .................................... 18382519

(51) Int. Cl.
*H02K 7/18* (2006.01)
*H02K 21/12* (2006.01)
(Continued)

(52) U.S. Cl.
CPC ............ *H02K 7/1838* (2013.01); *H02K 1/12* (2013.01); *H02K 1/22* (2013.01); *H02K 3/47* (2013.01); *H02K 7/183* (2013.01); *H02K 15/03* (2013.01); *H02K 15/061* (2013.01); *H02K 21/12* (2013.01); *F03D 7/02* (2013.01)

(58) Field of Classification Search
CPC ........ H02K 3/522; H02K 1/22; H02K 7/1838; H02K 21/12; H02K 15/061; H02K 15/03; H02K 15/00; H02K 1/12; H02K 3/50; H02K 3/47; H02K 2213/03; H02K 2213/09; H02K 15/0068; H02K 7/18; H02K 7/183; H02K 7/1807; H02K 7/1823; H02K 21/24;
(Continued)

(56) References Cited

U.S. PATENT DOCUMENTS

| 2010/0072854 A1* | 3/2010 | Stiesdal | H02K 1/187 |
| | | | 310/216.113 |
| 2012/0263602 A1* | 10/2012 | Booth | F03D 80/50 |
| | | | 416/244 R |

(Continued)

FOREIGN PATENT DOCUMENTS

| DE | 10 2009 045551 A1 | 5/2010 |
| EP | 2 169 814 A1 | 3/2010 |
| WO | WO 00/60719 A1 | 10/2000 |

OTHER PUBLICATIONS

EP Search Report, dated Jan. 2, 2019.

*Primary Examiner* — Quyen P Leung
*Assistant Examiner* — Alexander A Singh
(74) *Attorney, Agent, or Firm* — Dority & Manning, P.A.

(57) ABSTRACT

In a first aspect, a method of performing maintenance operations in an electrical machine is provided. The method comprises positioning the rotor in a first position; disconnecting electrical windings, removing one or more segments of an electrical conductor ring and positioning the rotor in a second position without connecting the removed segments of the electrical conductor ring. In a further aspect, a method of operating an electrical machine is also provided. In yet a further aspect, it is provided an electrical machine comprising an electrical conductor ring having a releasable segment.

20 Claims, 8 Drawing Sheets

(51) Int. Cl.
    *H02K 1/12*      (2006.01)
    *H02K 1/22*      (2006.01)
    *H02K 3/47*      (2006.01)
    *H02K 15/03*     (2006.01)
    *H02K 15/06*     (2006.01)
    *F03D 7/02*      (2006.01)

(58) Field of Classification Search
    CPC ......... H02K 15/0006; F03D 7/02; F03D 9/25;
                F03D 9/22; Y02E 10/72; Y02E 10/70
    USPC .......................................................... 310/89
    See application file for complete search history.

(56)          References Cited

U.S. PATENT DOCUMENTS

2015/0180288 A1    6/2015  Röer et al.
2017/0155298 A1    6/2017  Lan et al.
2017/0288500 A1*  10/2017  Eriksen ................. H02K 7/116

* cited by examiner

ELECTRICAL MACHINE AND MAINTENANCE METHODS THEREOF

The present disclosure relates to electrical machines and methods of performing maintenance operations in such electrical machines. The present disclosure also relates to methods of operating an electrical machine in which a plurality of windings have been disconnected.

BACKGROUND

Electrical machines, such as motors and generators, generally comprise a rotor structure and a stator structure. Large electrical generators may be permanent magnet excited generators (PMG) or electrically excited synchronous generators (EESG).

Such generators may be used for example in wind turbines, in particular in offshore wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators or electrically excited synchronous generators may also be coupled to a gearbox which increases the rotational speed of the generator to for example between 50 to 500 rpm or even more.

Electrical machines comprise a rotor which rotates with respect the stator. The rotor may be the inner structure and the stator the outer structure. The stator in this case thus surrounds the rotor. Alternatively, in some configurations it may be the opposite, i.e. the rotor surrounds the stator.

In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor rim in such a way that the plurality of magnets are fixed together to the rotor rim through the module base. The use of permanent magnet modules may facilitate the manufacturing of a rotor.

Electrically excited synchronous generators generally comprise a rotor having a plurality of pole shoes and excitation coils. In use, a current is applied to the excitation coils which create the polarity of the poles. Adjacent poles have a different magnetic polarity. As the rotor turns, the magnetic field from the pole shoes is applied to the windings of the stator causing a variable magnetic flux in the stator windings which produces a voltage in the stator windings. In electrically excited synchronous generators the magnetic field to generate the electrical power is created electrically. As a result, such generators do not require the use of permanent magnet containing rare earth elements.

Elements of the electrical machines may deteriorate during their lifetime and maintenance or replacement of these elements may thus be required. For example, magnets or magnet modules may be occasionally detached from the base or from the rotor rim due to adhesive failure. Windings from the stator and/or from the rotor, as in the case of electrical excited synchronous generators, may also become detached. In addition, external bodies, such as screws or nuts, may accidentally enter into the air gap of the electrical machine and may damage the elements of the stator, e.g. stator windings, and/or of the rotor, e.g. permanent magnets or rotor windings.

Replacement of the damaged elements or parts of the electrical machine may require access to the damaged area. Access to the inner structure of the electrical machine, e.g. the rotor, may be inhibited by the outer structure, e.g. the stator, which partially surrounds the inner structure. For example, in wind turbines, some areas of the generator, e.g. the inner structure, may only be accessible from inside the nacelle of the wind turbine. This may specifically occur in direct drive wind turbines wherein the rotating part of the generator is coupled directly to the hub or the rotor. Accessing the inner structure from the hub is generally very difficult because of the relatively compact size of the hub and because personnel cannot generally pass through the generator.

Moreover, electrical generators may also comprise cooling systems, sensors, winding connections and electrical connections, e.g. electrical rings, arranged on the nacelle side. Such elements may further hinder the access to the inner structure of the generator from the nacelle.

In large electrical generators having the rotor as the inner structure and the stator as the outer structure, electrical rings that connect the stator windings to a converter may be arranged on the stator and may thus block the access to the rotor. One way to access the area to be repaired of the inner structure, the rotor in this case, is to provide a window in the outer structure, to cut a segment of the electrical ring and then repairing or inspecting the part of the inner structure. However, the window needs to be positioned properly relatively to the part of the generator that is to be repaired, or inspected.

In those cases wherein several parts of the inner structure must be repaired or inspected, after cutting and removing a segment of the electrical ring and repairing a part of the inner structure, the plurality of the disconnected windings has to reconnected and the removed segment has to be reassembled to the remaining parts of the electrical ring for rotating the rotor to match the window and the next area to be repaired. When the window and the new area to be repaired substantially match, a segment of the electrical ring has to be removed to allow access to this area. After repairing this area, this segment has to be reassembled to the remaining parts of the electrical ring has to be reconnected. If there are several areas of the inner structure, this long process must be repetitively performed for each of the areas.

This process is time consuming and labor intensive. Such a long repair time consequently involves high costs, in particular in offshore wind turbines.

This size and type of electrical machines is not limited to generators in direct drive offshore applications, and not even to the field of wind turbines only. Electrical machines of considerable dimensions and installed in non-accessible locations that may suffer from the same problems and/or have the same complications may also be found e.g. in steam turbines and water turbines.

The present disclosure provides examples of systems and methods that at least partially resolve some of the aforementioned disadvantages.

SUMMARY

In a first aspect, a method of performing maintenance operations in an electrical machine is provided. The electrical machine has a plurality of electrical phases and comprises an inner structure, an outer structure and air gap arranged between the inner and the outer structure. The inner structure is one of the rotor and of the stator and the outer structure is the other of the rotor and of the stator.

The method comprises positioning the rotor in a first position for accessing a first region of the inner structure through a maintenance aperture in the outer structure; disconnecting a portion of the plurality of electrical windings of the stator from an electrical conductor ring; removing one or more segments of the electrical conductor ring at least partially corresponding to the maintenance aperture in the first position; positioning the rotor in a second position for accessing a second region of the inner structure through the maintenance aperture, without connecting the removed segments of the electrical conductor ring to the remaining segment or segments of the electrical conductor ring.

In this aspect, maintenance operations may be performed in several regions of the inner structure of an electrical machine without removing and reassembling a segment of the electrical conductor ring every time that the rotor rotates for positioning the maintenance aperture in the several areas to be repaired. As a result, time for performing maintenance operations in an electrical machine is reduced. In case of wind turbine generators operational cost are thus reduced and the energy produced by the wind turbine may consequently be increased.

In a further aspect, an electrical machine having a plurality of electrical phases and comprising an inner structure, an outer structure and an air gap arranged between the inner and the outer structure is provided. The inner structure is one of the rotor and of the stator and the outer structure is the other of the rotor and of the stator. The rotor is configured to rotate around a rotational axis extending from a first side to a second side, and the stator comprises a plurality of electrical windings and an electrical conductor ring extending along the stator circumference for connecting the electrical windings to an electrical converter. The outer structure comprises at least one maintenance aperture extending along a portion of the outer structure for accessing a portion of the inner structure from the first side and the electrical conductor ring comprises a plurality of segments having a releasable segment being releasable connected to the other segment or segments of the electrical conductor ring, wherein the releasable segment is configured to connect to a selection of the electrical windings, the selection having the same number of windings for each of the plurality of electrical phases.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
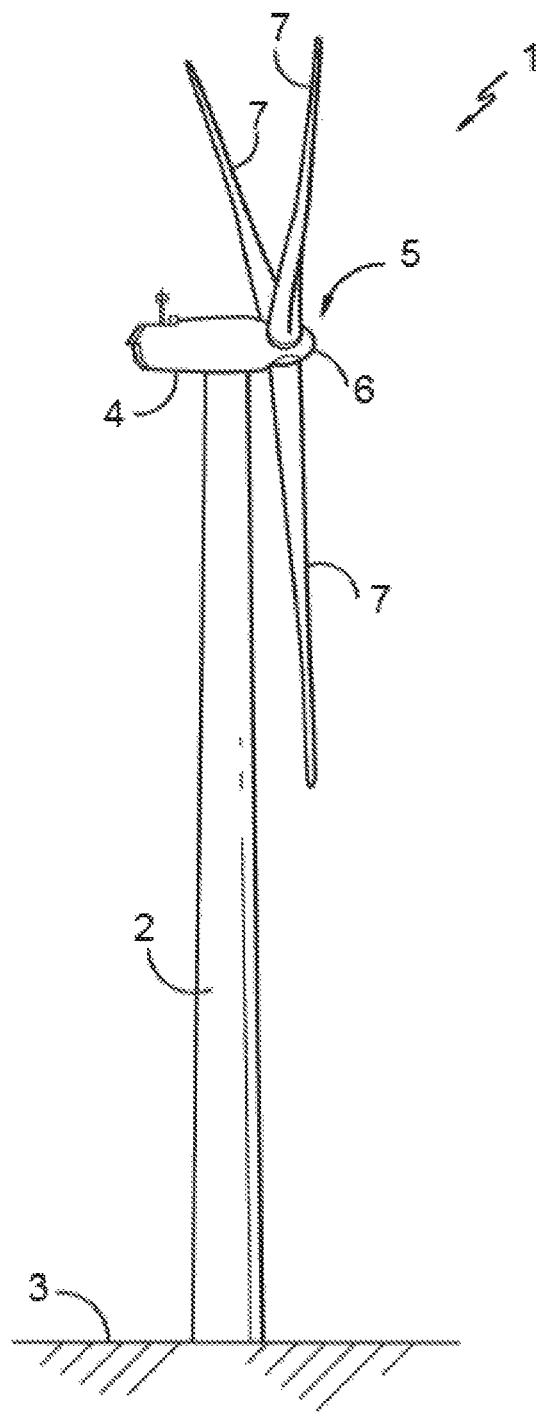
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced.

Figure 2:
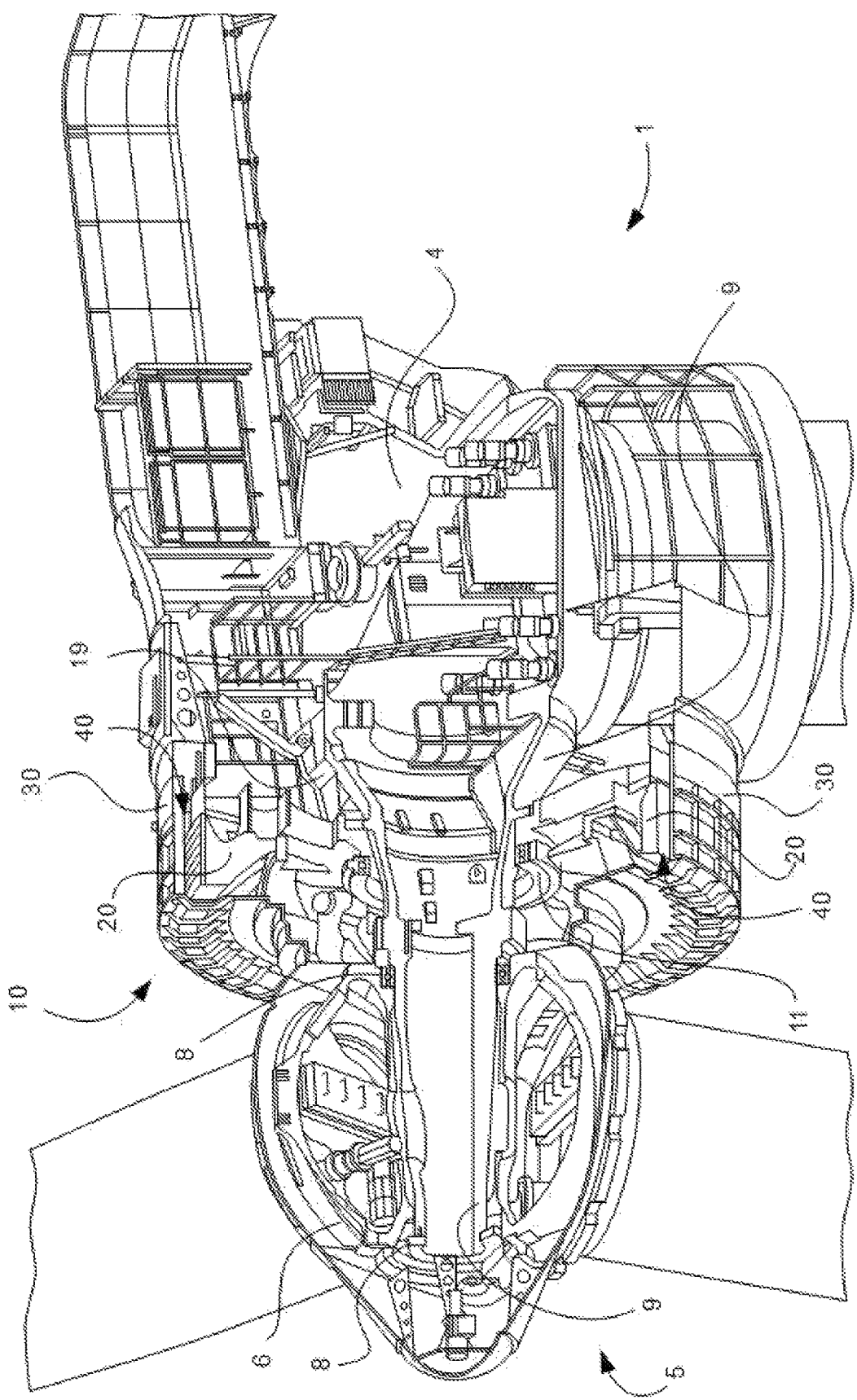
FIG. 2 illustrates a detailed, internal view of a nacelle of a wind turbine according to one example.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 20 of a generator 10 for rotation therewith. The rotation of the hub 6 may thus drive the rotor 20 of the generator 10.

In FIG. 2, the wind turbine rotor 5 may be rotatably mounted on a support frame 9 through two rotor bearings 8. In other examples, the support frame 9 may not extend through the hub 6 and therefore the rotor may be supported by a single rotor bearing 8, commonly called as the main bearing.

The generator 10 may comprise an inner structure 20 and an outer structure 30. In FIG. 2, the outer structure 30 is the stator and the inner structure 20 is the rotor. Between the outer structure 30 and the inner structure 20 an air gap 40 is arranged. The stator may be rigidly mounted on the support frame 9. The rotor may be rotatably mounted on the stator through a generator bearing 11 so that the rotor may rotate with respect to the stator around a rotational axis extending from a first side, e.g. form inside the nacelle 4, to a second side, the wind turbine rotor 5.

As may be appreciated in FIG. 2, the outer structure 30, the stator in FIG. 2, of the generator 10 may block the access to the inner structure 20, the rotor in FIG. 2, from inside the nacelle, because the outer structure 30 surrounds the inner structure 20.

In this example, the inner structure 20 i.e. the rotor in this example is not accessible from the hub 6. Direct drive wind turbines generally require large generators. Consequently, the diameter of these generators may be larger than the internal height of the nacelle. Only some regions of the outer structure may thus be accessible. For example, the lower part of the generator of FIG. 2 may not be directly accessible from the nacelle whereas the upper part of the generator may be accessible from it. In particular, the nacelle 4 may comprise a maintenance platform 19 for allowing the personnel to access a part of the generator.

The energy produced by the generator may be delivered to a converter which adapts the output electrical power of the generator to the requirements of the power grid. The electrical machine may comprise electrical phases, e.g. three electrical phases. The converter may be arranged inside the nacelle or inside the tower or externally in a platform.

Figure 3:
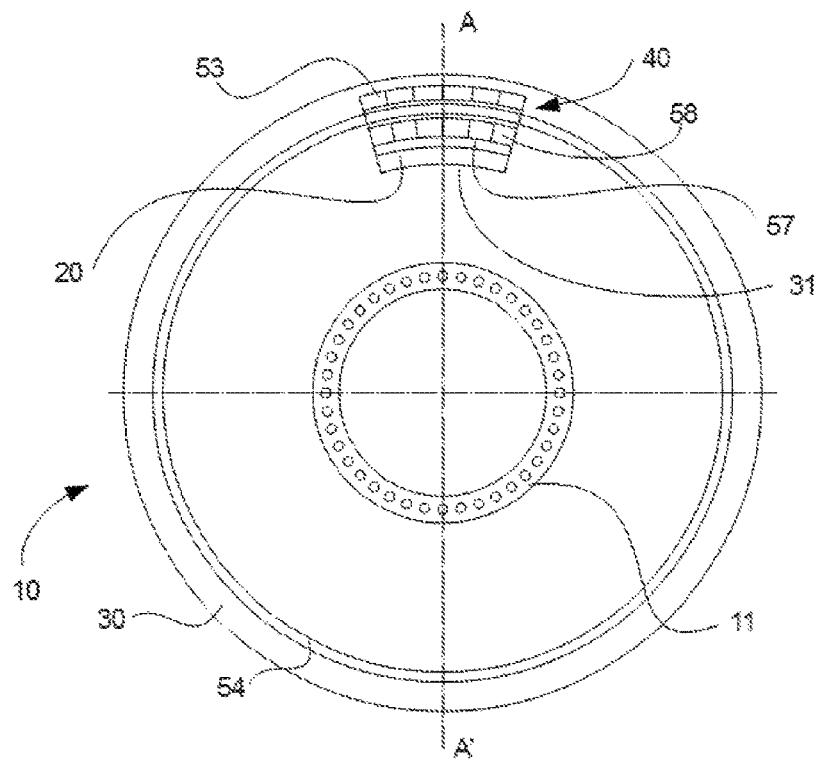
FIG. 3 schematically represents a frontal view of an example of an electrical machine.
Figure 4:
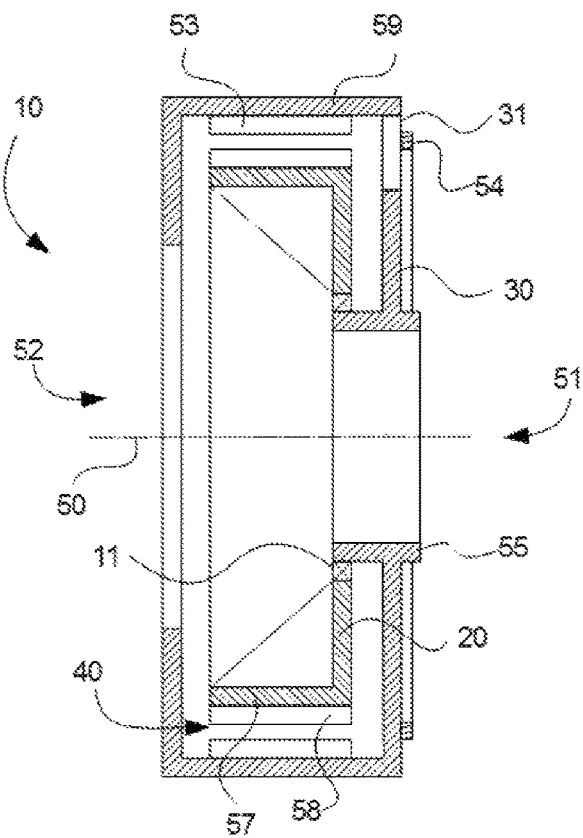
FIG. 4 schematically represents a sectional view along the line A-A' of the electrical machine of FIG. 3.

FIG. 3 and FIG. 4 schematically represent a frontal view and a sectional view along the line A-A' of an example of an electric machine. The electrical machine 10 comprises an inner structure 20 and outer structure 30 and an air gap 40 arranged between the inner and the outer structure. In this example, the inner structure 20 is the rotor and the outer structure 30 is the stator of the electrical machine 10. In other examples, the inner structure may be the stator and the outer structure may be the rotor of an electrical generator.

The rotor, in FIGS. 3 and 4 the inner structure 20, is configured to rotate around the axis 50 extending from a first side 51 to a second side 52. The inner structure 20 may be rotatably mounted on the outer structure 30 through the generator bearing 11. The stator may be rigidly connected to a supporting frame of a wind turbine through the stator flange 55. The electrical machine of FIG. 3 is shown from the first side 51.

The rotor, e.g. the inner structure 20, may comprise an external rotor rim 57 wherein a plurality of magnet modules 58 may be arranged. Each of the magnet modules 58 may comprise permanent magnets. Permanent magnet generators may be electrical machines of these types.

Alternatively, rather than magnet modules, the rotor may comprise a plurality of pole shoes and excitation coils which activates and creates the polarity of the poles. Electrically excited synchronous generators may be electrical machines of these types.

The stator, in FIGS. 3 and 4 the outer structure 30, comprises a plurality of electrical windings 53 and an electrical conductor ring 54. The stator may comprise an external stator rim 59. In these examples, the electrical windings 53 may be arranged on the inner side of the external outer rim 59. The electrical conductor ring 54 may circumferentially extend along the stator for connecting the electrical windings 53 to an electrical converter (not shown). The electrical conductor ring 54 may be arranged next to the external circumference of the outer structure 30. In some examples, the electrical conductor ring 54 is arranged outside the outer structure 30, e.g. arranged on the first side 51.

In other examples, the electrical conductor ring may be arranged between the outer 30 and the inner structure 20.

The outer structure 30 comprises at least one maintenance aperture 31 extending along a portion of the outer structure 30 for accessing a portion of the inner structure 20 from the first side 51. The electrical conductor ring 54 may obstruct the access to inner a portion of the inner structure 20. For this reason a segment of the electrical conductor ring may have to be removed.

Figure 5:
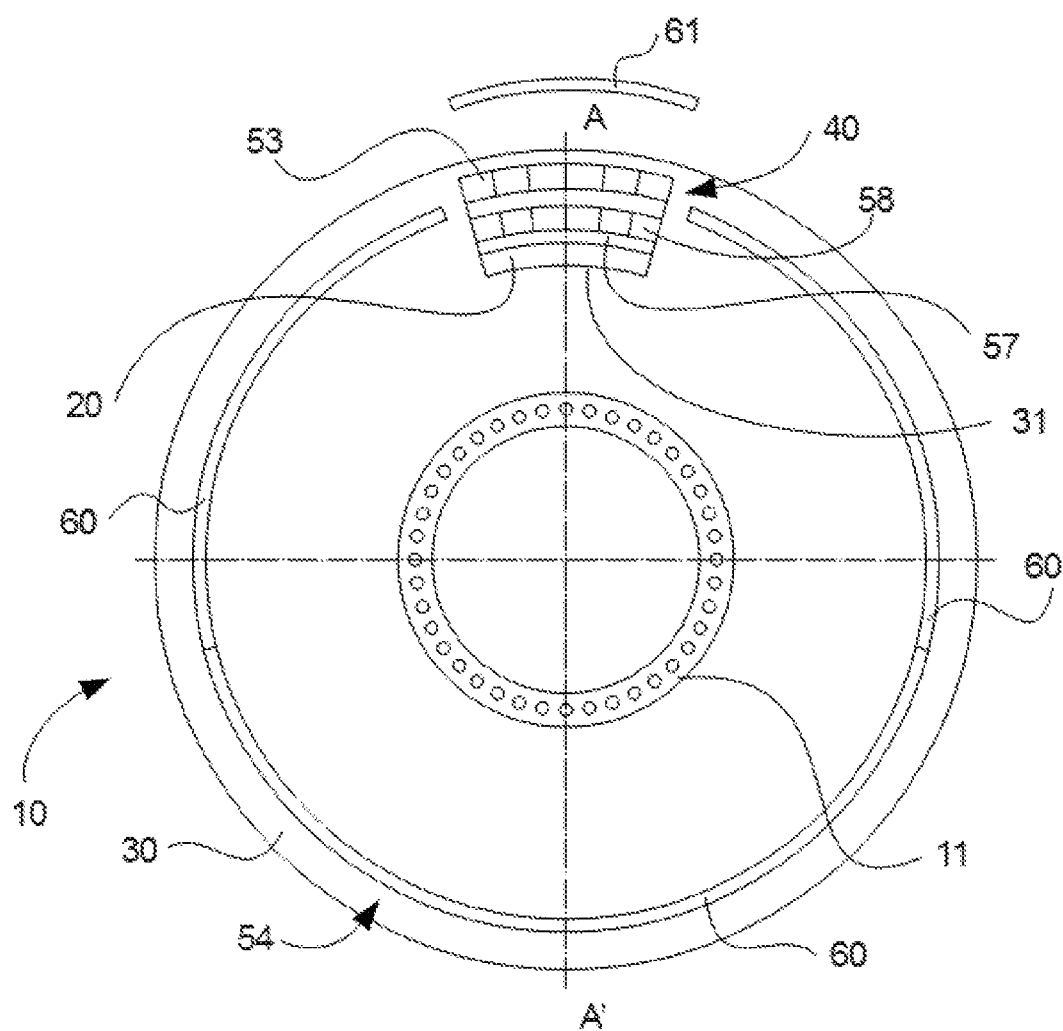
FIG. 5 schematically represents a frontal view of another example of an electrical machine.

The electrical machine 10 of FIG. 5 is similar to the electrical machine of FIGS. 3 and 4. However, the electrical machine of FIG. 5 comprises an electrical conductor ring 54 having a plurality of segments 60. At least one of the plurality of segments may be a releasable segment 61 which may be releasable connected to the other segments of the electrical conductor ring 54. The releasable segment 61 may be configured to connect to a selection of the electrical windings, the selection having the same number of windings for each of the plurality of electrical phases. In FIG. 5, the releasable segment 61 is shown disconnected from the other segment or segments 60 of the electrical conductor ring 54. In some examples, the conductor ring 54 may comprise two segments, one of them being the releasable segment 61. In other examples, the conductor ring may comprise more than two segments, e.g. six segments.

According to this aspect, the region of the electrical conductor ring that blocks the access to the inner structure through the maintenance aperture may be easily removed and then connected to other parts of the electrical conductor ring. Time for performing maintenance operations in the inner structure may consequently be reduced.

In some examples, the releasable segment may be releasable connected to the other portions or segments of the electrical conductor ring through a plug and socket coupling. Other suitable easy to connect and disconnect connections may also be used as for example connector clips or snap in connectors In some examples, the releasable segment 61 may substantially correspond to the at least one maintenance aperture 31. Therefore, by removing the releasable segment 61 the inner structure 20 may be accessible through the maintenance aperture 31.

In some examples, the maintenance aperture 31 may have a width greater than the width of the releasable segment 61, i.e. the dimensions of the maintenance aperture may be greater than the dimensions of the releasable segment 61. Alternatively, the maintenance aperture 31 may have a width lower than the width of the releasable segment 61.

In some examples, the maintenance aperture 31 may circumferentially extend between 5° and 90°, specifically between 10° and 45°, and more specifically between 10° and 30°.

In some examples, the outer structure 30 may comprise a plurality of maintenance apertures 31 distributed along the external circumference, e.g. the external rotor rim, of the outer structure for accessing to several parts of the inner structure and/or of the air gap. Accordingly, the electrical conductor ring may comprise a plurality releasable segments which corresponds to the plurality of maintenance apertures.

In some examples, the releasable segment 61 (or segments) may extend between 10° and 120°, specifically between 10° and 60°.

In some examples, the electrical conductor ring 54 may comprise a plurality of phase conductors rings and at least one neutral conductor ring running substantially parallel to each other. Each of the phase conductor rings may be associated with an electrical phase of the electrical machine and the at least one neutral conductor ring may be associated with the neutral of the electrical machine. Each of the electrical windings 53 may only be connected to a phase conductor ring and the number of electrical windings connected to each phase conductor rings may be the same. Consequently, the number of electrical windings connected to each electrical phase may be the same.

In some examples, the electrical machine may comprise three phases and a neutral, the number of the electrical windings of the stator may accordingly be multiples of three. In other examples, the electrical machine may comprise nine phases and three neutrals, the number of electrical windings of the stator may accordingly be multiple of nine.

The electrical machine may comprise a plurality of electrical phases, the electrical conductor ring may comprise a plurality of phase electrical rings being proportional to the number of the plurality of electrical phases and the dimensions of the releasable segment 61 may substantially correspond to a number of the electrical windings 53 The number of the electrical windings connected to each of the electrical phases may be the same. Before removing the releasable segment 61 for performing maintenance operations in the inner structure, the electrical windings 53 connected to such a releasable segment 61 may be disconnected from it, e.g. disconnected from a phase electrical ring. The same number of windings may be disconnected from each of the electrical phases. Accordingly, the electrical phases of the electrical machine may remain electrically equilibrated.

In some examples, the electrical machine may be an electrical generator, specifically a generator for a direct-drive wind turbine, and more specifically a permanent magnet generator.

Figure 6:
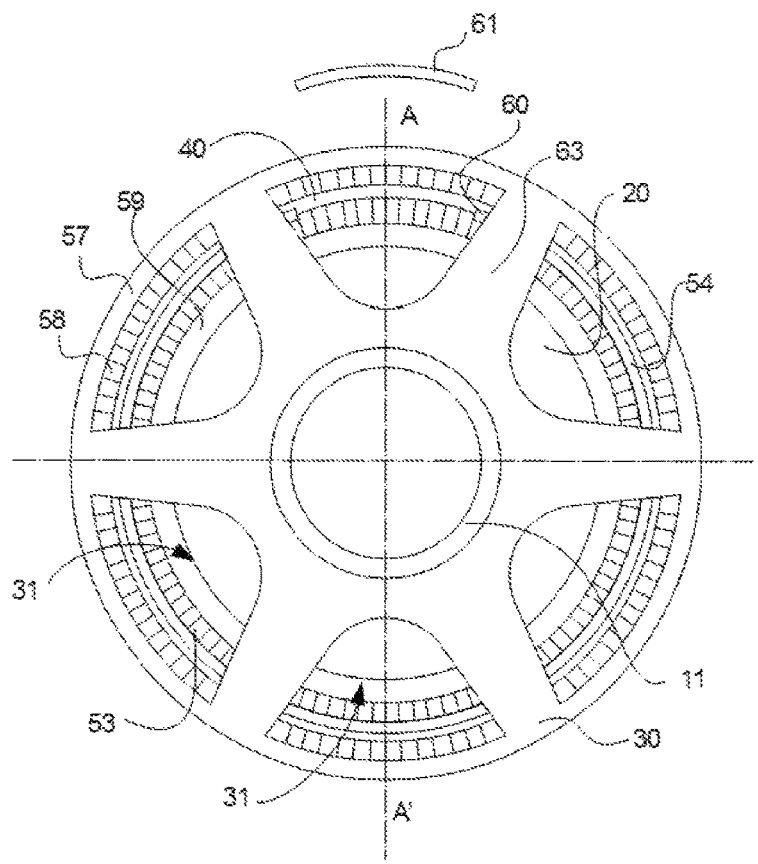
FIG. 6 schematically represents a frontal view of an example of an electrical machine.
Figure 7:
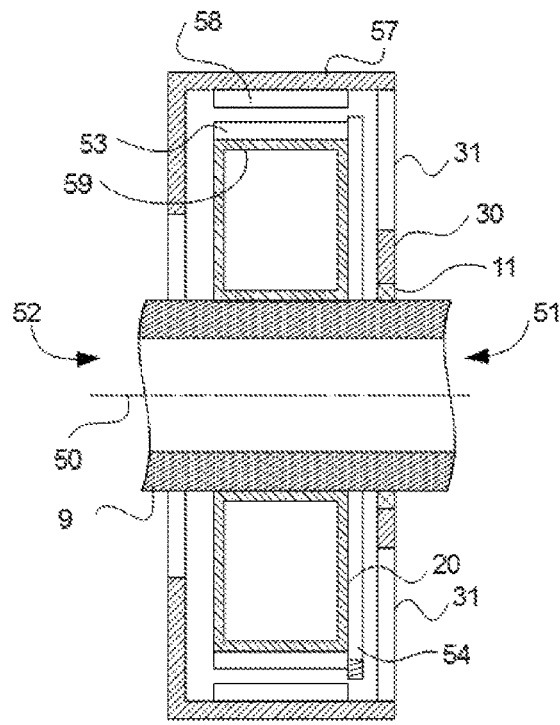
FIG. 7 schematically represents a sectional view along the line A-A' of the electrical machine of FIG. 6.

FIG. 6 and FIG. 7 schematically represents a frontal view and a sectional view along the line A-A' of an example of an electrical machine. The electrical machine of FIG. 6 and FIG. 7 is similar to other examples herein described. However, in FIGS. 6 and 7, the inner structure is the stator and the outer structure is the rotor.

In FIG. 6, a segment of the electrical conductor ring is depicted removed from the remaining part(s) of the electrical conductor ring. In some of these examples, the removed segment may have been cut from the electrical conductor ring. Alternatively, the removed segment may be a releasable segment which has been disconnected from the other segment or segments of the electrical conductor ring.

The electrical machine 10 comprises an inner structure 20 and outer structure 30 and an air gap 40 arranged between the inner and the outer structure. In this example, the inner structure 20 is the stator and the outer structure 30 is the rotor of the electrical machine 10.

The rotor is configured to rotate around the axis 50 extending from a first side 51 to a second side 52. The outer structure 20 may be rotatably mounted on a supporting frame 9 of a wind turbine through a generator bearing 11. The outer structure may be connected to a rotor hub of a wind turbine (not shown in this Figure) which makes it to rotate. The inner structure 30 may rigidly connected to a supporting frame 9 of a wind turbine. Stator windings 53 may be arranged on the outer side of an external stator rim 59. Magnet modules 58 may be arranged in the inner side of the external rotor rim 57.

In FIGS. 6 and 7, the rotor may comprise a rotor rim 57 and plurality of rotor spokes 63 extending from the rotational axis 50 to the rotor rim 57, wherein at least one maintenance aperture 31 may correspond to the space between two adjacent rotor spokes 63. In this example, the rotor may comprise six rotor spokes 63 that form six maintenance apertures 31. In other examples, the number of rotor spokes may be lower or greater than six.

In these examples, by rotating the outer structure 30 with respect to the inner structure 20, the maintenance aperture 31 may match the region of the inner structure and/or of the air gap to be repaired, and therefore this area may be accessed from the first side, e.g. from inside a nacelle, through a maintenance aperture 31 passing through the outer structure 30. However, a region of the electrical conductor ring 54 may block the access to the inner structure 20. For this reason, a segment of the conductor ring 54 may need to be removed. In some of these examples, the electrical conductor ring 54 may comprise a plurality of segments 60 having a releasable segment 61 being releasable connected to the other segments 60 of the electrical conductor ring 54.

Figure 8:
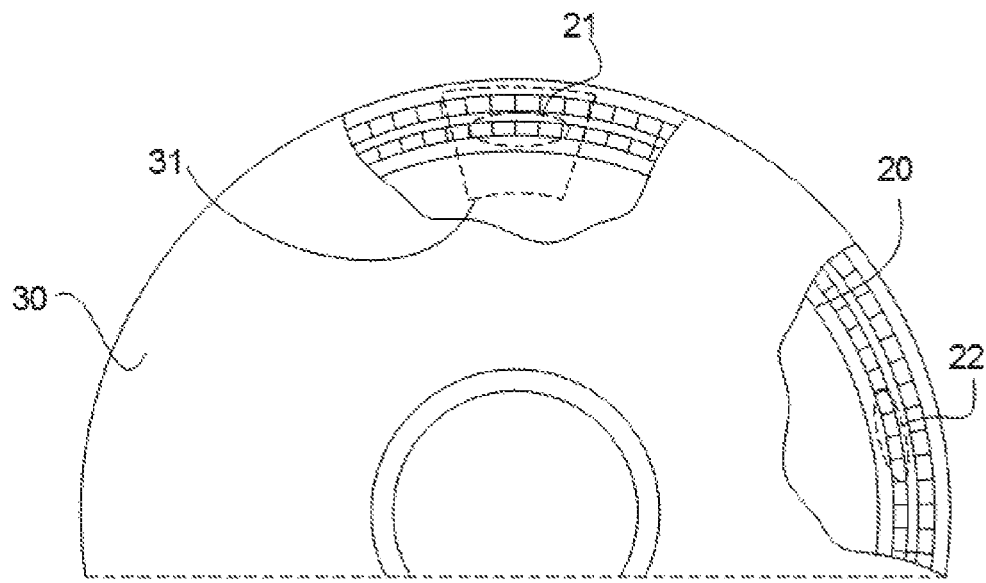
FIG. 8 schematically represents a frontal view of an example of an electrical machine in a first position.
Figure 9:
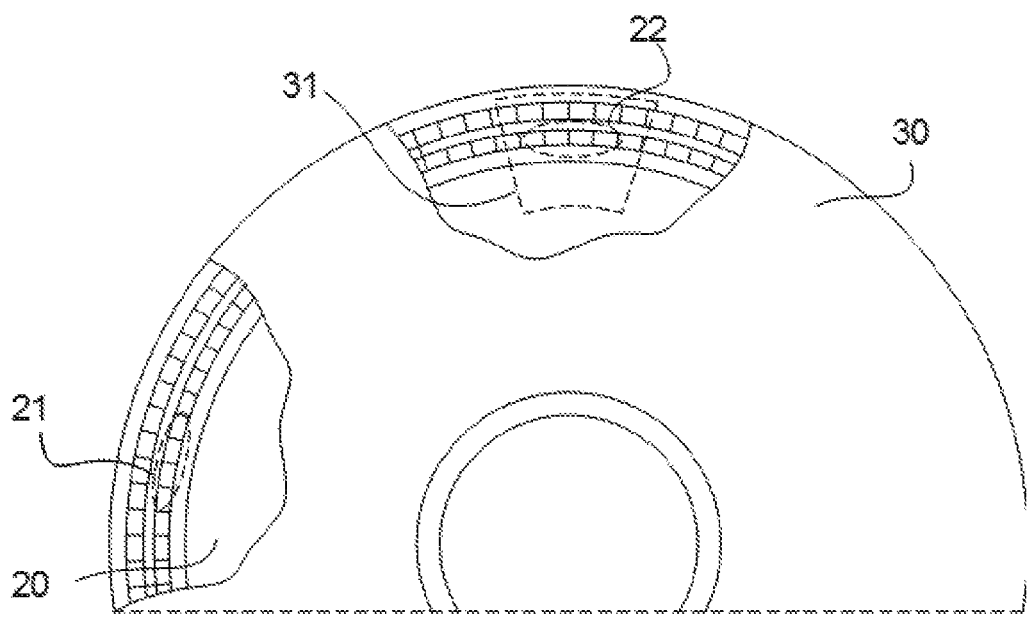
FIG. 9 schematically represents a frontal view of an example of an electrical machine in a second position.

FIGS. 8 and 9 respectively represent a frontal view of an example of an electrical machine in a first and in a second position. In these figures, the electrical machine has the rotor as the inner structure 20 and the stator as the outer stator 30. The electrical machine is illustrated from the first side. The electrical conductor ring of the electrical machine is not illustrated in these figures for clearly showing the regions to be maintained of the inner structure, however it should be clear that this electrical machine comprises an electrical conductor ring according to any of the examples herein described, e.g. having at least one releasable segment or being a uniform ring.

These figures comprise two partial cuttings that show the first and the second region of the inner region to be maintained or inspected. A dotted line represents the maintenance aperture 31 of the outer structure 30.

In FIG. 8 the rotor is positioned in a first position. In this position, the first region 21 of the inner structure 20 may be accessible from the first side through the maintenance aperture 31 after removing a segment of the electrical conductor ring partially corresponding to the maintenance aperture. In this position, the second region 22 of the inner structure cannot be accessible from the first side, since the outer structure blocks the access.

In FIG. 9, the rotor is positioned in the second position. The rotor may be rotated from the first to the second position without reconnecting the removed segment corresponding to the maintenance aperture 31 to the other parts of the electrical conductor ring for example for repairing or performing maintenance or inspecting operations in the first region 21 of the inner structure. The second region 22 of the inner structure 20 may be accessible through the maintenance aperture when the rotor is in the second position. However, the first region 21 cannot be accessible through the maintenance aperture.

From the first to the second position, the rotor may be rotated an angle between 10° and 350°, specifically between 10° and 180, and more specifically between 10° and 90°.

Rotating the rotor from a first to a second position may be at a rotational speed lower than 1 r.p.m., specifically lower than 0.1 r.p.m. and more specifically equal or lower than 0.01 r.p.m.

Figure 10:
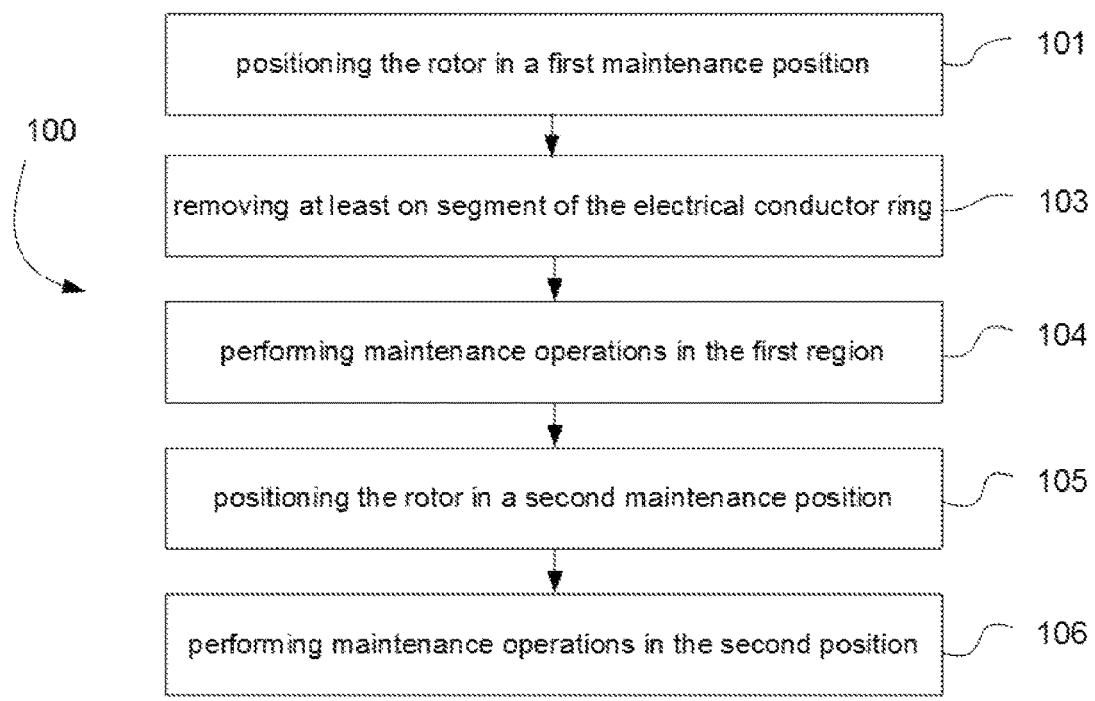
FIG. 10 is a flow diagram of a method of performing maintenance operations in an electrical machine according to an example.

FIG. 10 is a flow diagram of a method of performing maintenance operations 100 in an electrical machine according to an example.

The electrical machine may have a plurality of electrical phases and may comprise an inner structure, an outer structure and an air gap arranged between the inner and the outer structure; the inner structure may be one of the rotor and of the stator and the outer structure is the other of the rotor and of the stator. The rotor of the electrical machine may be configured to rotate around a rotational axis extending from a first side to a second side and the stator of the electrical machine may comprise a plurality of electrical windings and an electrical conductor ring circumferentially extending along the stator for connecting the electrical windings to an electrical converter. The outer structure of the electrical machine may comprise at least one maintenance aperture extending along a portion of the outer structure for accessing a portion of the inner structure from the first side.

Box 101 represents positioning the rotor in a first position for accessing a first portion of the inner structure through the maintenance aperture. When the rotor is positioned in the first position, the first portion of the inner structure may substantially match the maintenance aperture of the outer structure.

In some examples, the outer structure may be the stator and the inner structure may be the rotor. In these examples, the rotor may rotate to match the area to be maintained of the rotor and the maintenance aperture of the stator. The maintenance aperture may thus be arranged in a fixed position and several regions of the rotor may be repaired or inspected from such a fixed maintenance aperture. As result, a maintenance platform for facilitating the access to the rotor may be arranged in the first side, e.g. inside a wind turbine nacelle.

Alternatively, the outer structure may be the rotor and the inner structure may be the stator. In these examples, the rotor is positioned in a first position to match the first region of the stator and the maintenance aperture, e.g. arranged between radial spokes of the rotor.

In some examples, the electrical machine may be an electrical generator for a wind turbine. In these cases, the electrical generator may act as a motor during the rotation of the rotor.

Box 102 represents disconnecting a selection of the plurality of electrical windings of the stator from the electrical conductor ring. In some examples, the number of electrical windings disconnected from the electrical conductor ring is the same in each of the electrical phases of the electrical machine. The electrical phases of the electrical machine may accordingly be electrically balanced. In some of these cases, it may be necessary to disconnect more electrical windings corresponding Box 103 represents removing one or more segments of the electrical conductor ring at least partially corresponding to the maintenance aperture when the rotor is in the first position. By removing the one or more segments of the electrical conductor ring the accessibility to the first region of the inner structure is enhanced.

In some examples, removing a segment of the electrical conductor ring may comprise cutting the electrical conductor ring, e.g. cutting the plurality of phase conductor rings and neutral conductor rings, from the remaining portion or segment(s) of the electrical conductor ring. Alternatively, the segment to be removed may be a releasable segment, e.g. connected through a plug and socket coupling, and therefore the segment may be more easily disconnected from the remaining segment(s) of the electrical conductor ring.

Box 105 represents positioning the rotor in a second position for accessing a second region of the inner structure through the maintenance aperture without connecting the removed segments of the electrical conductor ring to the remaining portion of the electrical conductor ring. The electrical machine may thus act as motor for rotating the rotor. During this rotation, the current circulating through the electrical windings may be controlled to avoid electrical unbalances. As a result, reconnecting the removed segments to the remaining parts of the electrical conductor ring before positioning the rotor in the second position may thus not be necessary. Maintenance, repairing or inspecting times may consequently be reduced.

In some examples, the method may further comprise disconnecting one or more additional electrical windings of the stator such that for each of the electrical phases the same number of electrical windings has been disconnected. In some of these examples, the number of disconnected electrical windings may not correspond to the number of electrical windings connected to the one or more segments of the ring to be removed. In these cases, it may be necessary to disconnect more electrical windings corresponding to other portion(s) or segment(s) of the ring until the number of disconnected windings is proportional to the number of electrical phases of the electrical machine. These additional disconnected windings may be located adjacent to the disconnected electrical windings corresponding to the one or more segments to be removed. Alternatively, they may be located far away from those corresponding to the one or more segments to be removed, e.g. in an easily accessible position.

The method may further comprise performing maintenance operations in the first region of the inner structure through the maintenance aperture when the rotor is in the first position and/or in the second region of the inner structure through the maintenance aperture when the rotor is in the second position. In some examples, e.g. wherein the rotor is the inner structure, maintenance operations may comprise repairing or replacing magnet modules or pole shoes and/or excitation coils. In other examples, e.g. wherein the stator is the inner structure, maintenance operations may comprise repairing or replacing electrical windings of the stator. Performing maintenance operations may additionally comprise inspecting the first and/or the second region of the inner structure.

In some examples, the inner structure may be the rotor and the outer structure may be the stator. In some of these examples, the electrical machine may be a permanent magnet generator, e.g. permanent magnet generator for direct drive wind turbine. In these examples, the rotor of the permanent magnet generator may comprise a plurality of magnet modules having permanent magnets arranged on the outer circumference of the rotor. In some of these examples, the method of performing maintenance operations in an electrical machine may comprise performing maintenance operations in the first and/or in the second regions of the rotor including inserting a maintenance tool through the maintenance aperture for extracting a magnet module. Extracting the magnet modules may therefore be more efficient.

In some examples, the method of performing maintenance operations in an electrical machine may further comprise positioning the rotor in further positions, e.g. in a third and in a fourth position, for accessing to further regions of the inner structure, e.g. a third and a fourth region, through the maintenance aperture without connecting the removed segment and performing the corresponding maintenance operations in these additional regions of the inner structure.

The method of performing maintenance operations in an electrical machine may further comprise connecting the removed segments of the electrical conductor ring to the remaining segment or segments of the electrical conductor ring after performing the maintenance operations in the regions of the inner structure to be maintained, e.g. in the first and in the second regions of the inner structure.

In some examples, the positioning the rotor in a second position may comprise rotating the rotor at a rotational speed lower than 1 r.p.m., specifically lower than 0.1 r.p.m. and more specifically equal or lower than 0.01 r.p.m. Such a very slow rotational speed of the rotor may help to reduce the frequency and the electrical machine may act as a resistive circuit as the inductive reactance may be practically negligible.

In some examples, disconnecting a number of electrical windings proportional to the number of electrical phases and rotating the rotor at a low rotational speed, e.g. lower than 1 r.p.m., may provide a reliable method as the electrical phases may be equilibrated and the electrical windings may be protected against high currents. According to these aspects, the rotor may thus be more precisely positioned whereas the current in each of the connected windings may be controlled to protect the electrical windings to overcurrent.

Figure 11:
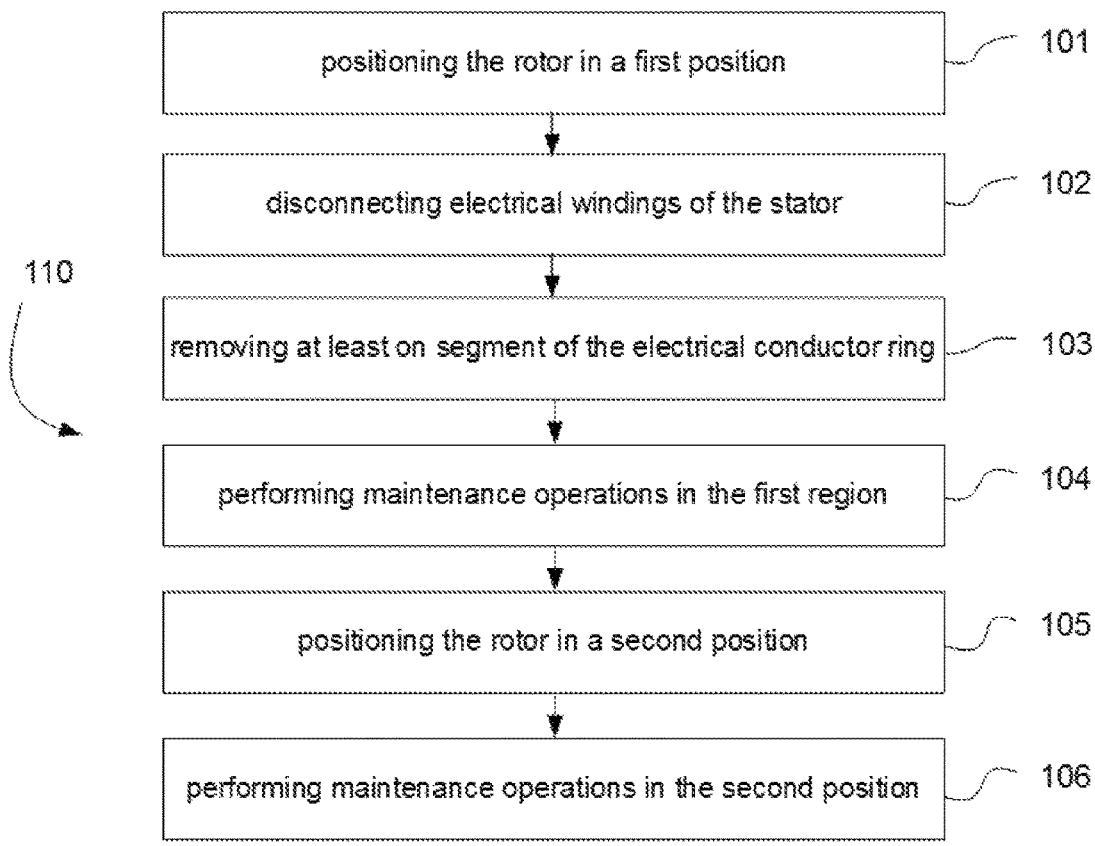
FIG. 11 is a flow diagram of a method of performing maintenance operations in at least two regions of an inner structure of an electrical machine according to an example.

FIG. 11 is a flow diagram of a method of performing maintenance operations 100 in at least two regions of an inner structure of an electrical machine according to an example. The electrical machine may be according to any of the examples herein describes, for example with the electrical machine described with respect to the FIG. 10.

Box 101 represents positioning the rotor in a first position for accessing a first portion of the inner structure to be maintained through the maintenance aperture. Positioning the rotor in a first maintenance position may be according to any of the examples herein described.

Box 102 represents disconnecting the electrical windings of the stator at least partially corresponding to one or more segments of the electrical conductor ring to be removed from the electrical conductor ring. In some examples, only the electrical windings connected to the segments to be removed are disconnected from the ring. The segments may thus be more easily removed. Alternatively, electrical windings connected to portions of the electrical conductor ring not to be removed may additionally be disconnected.

In some examples, the electrical machine may comprise a plurality of electrical phases and the number of the electrical windings disconnected from the electrical conductor ring may be the same for each of the electrical phases. The electrical phases of the electrical machine may accordingly be electrically balanced.

In some of these examples, the number of disconnected electrical windings being the same for each of the electrical phases may not correspond to number of electrical windings connected to the one or more segments of the ring to be removed. In these cases, it may be necessary to disconnect more electrical windings corresponding to other segment(s) of the ring until the number of disconnected windings is the same for each of the electrical phases of the electrical machine. These additional disconnected windings may be located adjacent to the disconnected electrical windings corresponding to the segments to be removed. Alternatively, they may be located far away from those corresponding to the segments to be removed, e.g. in an easily accessible position.

Box 103 represents removing one or more segments of the electrical conductor ring at least partially corresponding to the maintenance aperture. This may be according to any of the examples herein described, in particular according to examples described with respect to FIG. 10.

Box 104 and 105 represents performing maintenance operations in the first region and in the second region of the inner structure as described with respect to the FIG. 10. Box 105 represents positioning the rotor in a second position as described with respect to FIG. 10.

In some examples, the method of performing maintenance operations in at least two regions of an inner structure of an electrical machine may comprise connecting the removed segments of the electrical conductor ring to the remaining segment or segments of the electrical conductor ring after performing the maintenance operations in the second region of the rotor.

In some examples, the electrical machine may be an electrical generator for a wind turbine. In these cases, the electrical generator may act as a motor during the rotation of the rotor. In some of these cases, the generator may be a permanent magnet generator.

In some examples, the inner structure may be the rotor and the outer structure may be the stator. Alternatively, the inner structure may be the stator and the outer structure may be the rotor.

In some examples, the method of performing maintenance operations in at least two regions of an inner structure of an electrical machine may comprise performing maintenance operations in several additional regions of the inner structure. Accessing these additional regions may be achieved by positioning the rotor in a position for accessing these regions to be maintained through the maintenance aperture from the first side.

In some examples, the positioning the rotor in a second position or in further positions may comprise rotating the rotor at a lower rotational speed. Such a lower rotational speed may be lower than 1 r.p.m., specifically lower than 0.1 r.p.m. and more specifically equal or lower than 0.01 r.p.m.

Figure 12:
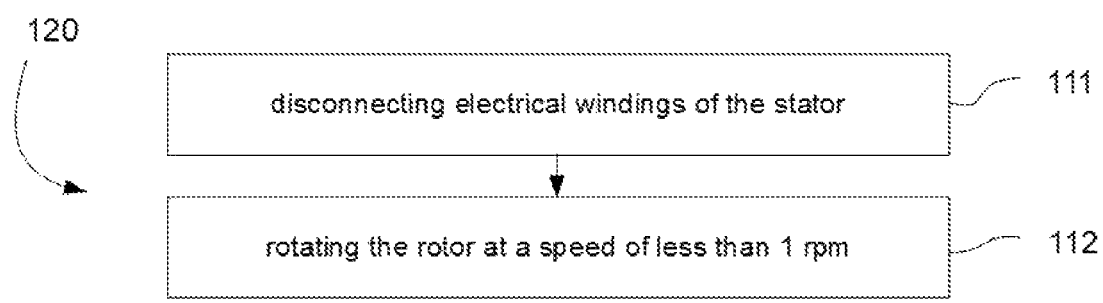
FIG. 12 is a flow diagram of a method of operating an electrical machine having a plurality of electrical phases according to an example.

FIG. 12 is a flow diagram of a method of operating 120 an electrical machine having a plurality of electrical phases. The electrical machine may comprise a rotor and a stator, the stator having a plurality of electrical windings wherein a portion of the electrical windings have been disconnected.

Box 111 represents disconnecting additional windings of the electrical windings such that each of the electrical phases has the same number of connected windings. The phases are thus equilibrated.

Rotating the rotor of the generator at a speed of less than 1 r.p.m is represented in Box 112. In some examples the rotation speed may be lower than 0.1 r.p.m. and specifically equal or lower than 0.01 r.p.m.

According to these aspects, the rotor may be rotated when a portion of the electrical windings have been disconnected, e.g. because the inner structure has been maintained or inspected.

In some examples, the method of operating an electrical machining according to these examples may be a part of a method of performing maintenance operations according to any of the examples herein disclosed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine having a plurality of electrical phases, comprising:
   an inner structure and an outer structure, with an air gap between the inner and the outer structure;
   wherein the inner structure is one of a rotor or a stator of the electrical machine and the outer structure is an other of the rotor or the stator of the electrical machine;
   the rotor configured to rotate around a rotational axis extending from a first side to a second side;
   the stator comprises a plurality of electrical windings and an electrical conductor ring extending along a circumference of the stator for connecting the electrical windings to an electrical converter;
   the outer structure comprising at least one maintenance aperture extending along a portion of the outer structure for accessing a portion of the inner structure from the first side; and
   the electrical conductor ring comprises a plurality of segments having a releasable segment being releasably connected to other segment or segments of the electrical conductor ring; and
   wherein the releasable segment connects a selection of the electrical windings, the selection having a same number of windings for each of the plurality of electrical phases.

2. The electrical machine according to claim 1, wherein the inner structure is the stator and the outer structure is the rotor.

3. The electrical machine according to claim 2, wherein the rotor comprises an external rotor rim and a plurality of rotor spokes extending radially from the rotational axis to the rotor rim, wherein the at least one maintenance aperture corresponds to the distance between two adjacent rotor spokes.

4. The electrical machine according to claim 1, wherein the inner structure is the rotor and the outer structure is the stator.

5. The electrical machine according to claim 1, wherein the releasable segment of the electrical conductor ring corresponds to the at least one maintenance aperture.

6. The electrical machine according to claim 5, wherein the maintenance aperture circumferentially extends between 5° and 90°.

7. The electrical machine according to claim 5, wherein the releasable segment extends between 10° and 120°.

8. The electrical machine according to claim 1, wherein the electrical machine is an electrical generator.

9. A method of performing maintenance operations in an electrical machine, the electrical machine having a plurality of electrical phases and comprising an inner structure; an outer structure, and an air gap between the inner and the outer structure, the inner structure being one of a rotor or a stator and the outer structure being an other of the rotor or the stator,
   the method comprising:
   positioning the rotor in a first position for accessing a first region of the inner structure through a maintenance aperture in the outer structure;
   disconnecting a portion of a plurality of electrical windings of the stator from an electrical conductor ring extending along a circumference of the stator for connecting the electrical windings to an electrical converter;
   removing one or more segments of the electrical conductor ring at least partially corresponding to the maintenance aperture in the first position; and,
   positioning the rotor in a second position for accessing a second region of the inner structure through the maintenance aperture without connecting the removed segments of the electrical conductor ring to the remaining segment or segments of the electrical conductor ring.

10. The method according to claim 9, further comprising disconnecting one or more additional electrical windings of the stator such that for each of the electrical phases, the same number of electrical windings has been disconnected.

11. The method according to claim 9, further comprising performing maintenance operations in the first region of the inner structure through the maintenance aperture when the rotor is in the first position or in the second region of the inner structure through the maintenance aperture when the rotor is in the second position.

12. The method according to claim 11, further comprising connecting the removed segments of the electrical conductor ring to the remaining segment or segments of the electrical conductor ring after performing the maintenance operations in the first and in the second regions of the inner structure.

13. The method according to claim 9, wherein positioning the rotor in the second position comprises rotating the rotor at a rotational speed lower than 1 r.p.m.

14. The method according to claim 9, wherein the rotor is the inner structure and the stator is the outer structure.

15. The method according to claim 14, wherein the electrical machine is a permanent magnet generator and the rotor comprises a plurality of magnet modules having permanent magnets arranged on an outer circumference of the rotor, the method further comprising the performing of the maintenance operations in the first or in the second regions of the rotor includes inserting a maintenance tool through the maintenance aperture for extracting a magnet module.

16. The method according to claim 9, wherein the stator is the inner structure and the rotor is the outer structure.

17. A method of performing maintenance operations in at least two regions of an inner structure of an electrical machine, the electrical machine comprising an inner structure, an outer structure, and an air gap arranged between the inner and the outer structure, the inner structure being one of a rotor or a stator and the outer structure being an other of the rotor or the stator, the rotor configured to rotate around an rotational axis extending from a first side to a second side, the stator comprising a plurality of electrical windings and an electrical conductor ring extending along a circumference of the stator for connecting the electrical windings to an electrical converter, the outer structure comprising at least one maintenance aperture extending along a portion of the outer structure for accessing a portion of the inner structure from the first side; the method comprising:
   positioning the rotor in a first position for accessing a first region of the inner structure to be maintained through the maintenance aperture from the first side;
   disconnecting the electrical windings of the stator at least partially corresponding to one or more segments of the electrical conductor ring to be removed from the electrical conductor ring;
   removing one or more segments of the electrical conductor ring at least partially corresponding to the maintenance aperture;
   performing maintenance operations in the first region of the inner structure through the maintenance aperture;

positioning the rotor in a second position for accessing a second region of the inner structure through the maintenance aperture from the first side; and performing maintenance operations in the second region of the inner structure to be maintained through the maintenance aperture.

18. The method according to claim 17, wherein the electrical machine comprises a plurality of electrical phases and the number of the electrical windings disconnected from the electrical conductor ring is the same for each of the plurality of electrical phases of the electrical machine.

19. The method according to claim 17, further comprising connecting the removed segments of the electrical conductor ring to the remaining segment or segments of the electrical conductor ring after performing the maintenance operations in the second region of the rotor.

20. The method according to claim 17, wherein positioning the rotor in a second position comprises rotating the rotor of the generator at a speed of less than 1 rpm.

* * * * *